United States Patent [19]

Smith

[11] Patent Number: 4,937,860
[45] Date of Patent: Jun. 26, 1990

[54] SECURITY DEVICE FOR A TELEPHONE INSTRUMENT

[76] Inventor: Philip Smith, 23, Raheen Park, Ballyfermot, Dublin 10, Ireland

[21] Appl. No.: 205,844

[22] Filed: Jun. 13, 1988

[51] Int. Cl.$^5$ ............................................. H04M 1/66
[52] U.S. Cl. .................................... 379/445; 379/441
[58] Field of Search ............... 379/445, 437, 435, 441, 379/399, 451

[56] References Cited

U.S. PATENT DOCUMENTS

| | | | |
|---|---|---|---|
| 2,928,909 | 3/1960 | Allen | 379/445 |
| 3,391,256 | 7/1968 | Nawman | 379/445 |
| 3,495,050 | 2/1970 | Bart | 379/445 |
| 4,005,279 | 1/1977 | Richter | 379/445 |
| 4,204,097 | 5/1980 | Schmit | 379/445 |
| 4,280,025 | 7/1981 | Carlberg . | |
| 4,304,971 | 12/1981 | Flax . | |
| 4,323,739 | 4/1982 | Flax et al. . | |
| 4,355,212 | 10/1982 | Kosten | 379/435 |
| 4,396,810 | 8/1983 | Cover . | |
| 4,398,067 | 8/1983 | Rubinstein et al. . | |
| 4,451,713 | 5/1984 | Wittes . | |
| 4,741,032 | 4/1988 | Hampton | 379/399 |

FOREIGN PATENT DOCUMENTS

| | | | |
|---|---|---|---|
| 0220684 | 11/1959 | Australia | 379/445 |
| 0074617 | 3/1983 | European Pat. Off. . | |
| 3112715 | 10/1982 | Fed. Rep. of Germany . | |
| 3205626 | 8/1983 | Fed. Rep. of Germany . | |
| 384773 | 12/1932 | United Kingdom . | |
| 0433304 | 8/1935 | United Kingdom | 379/445 |
| 1048517 | 11/1966 | United Kingdom . | |
| 1471318 | 4/1977 | United Kingdom . | |
| 1531895 | 11/1978 | United Kingdom . | |

Primary Examiner—Jin F. Ng
Assistant Examiner—Randall S. Vaas
Attorney, Agent, or Firm—Young & Thompson

[57] ABSTRACT

A security device for a telephone instrument including a separate handset to prevent full access to the telephone dial or push-buttons but allow unobstructed access to the handset. The instrument is placed between base and cover portions of the device to partially enclose the instrument and block access to the dial or push buttons to prevent outgoing calls, which portions may be releasably locked together with a locking device.

10 Claims, 3 Drawing Sheets

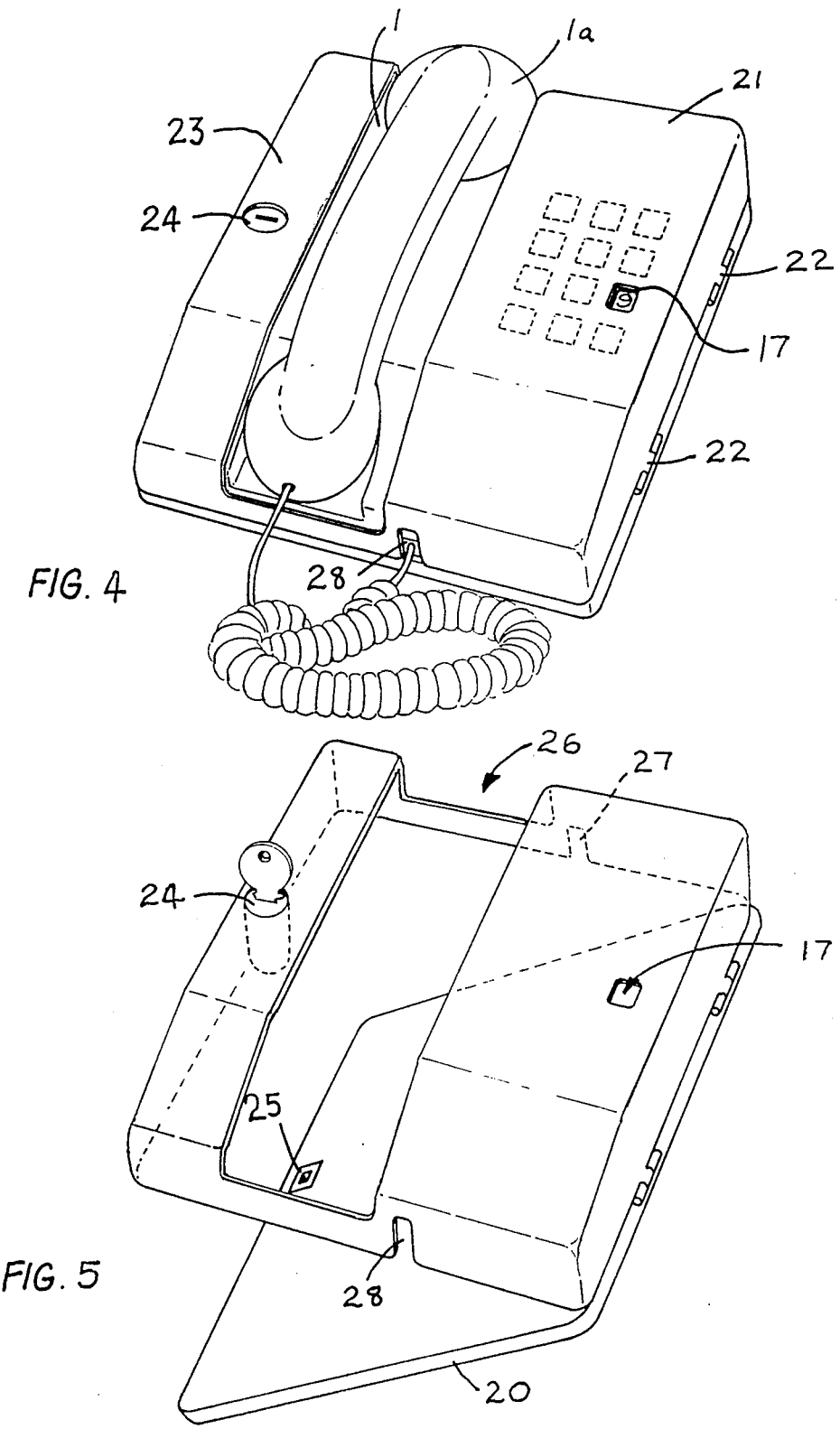

SECURITY DEVICE FOR A TELEPHONE INSTRUMENT

FIELD OF THE INVENTION

The present invention relates to a security device adapted for use with telephone instruments, in particular those having a push-button dialling facility.

BACKGROUND OF THE INVENTION

Push-button dialling has now become the norm in telephone instrument design, and the present invention seeks to provide an improved security device serving to prevent access to the push-buttons in order to prevent or control unauthorised usage of the telephone. Push-button locks are known from the prior art, for example, U.S. Pat. Specification No. 4 451,713 describes a lock for two adjacent push-buttons in a push-button array. U.S. Pat. Specification No. 4,398,067 describes a lock for inactivating a single push-button. German Patent Specifications Nos. 3112715A and 3205626A describe a small housing adapted to cover the array of push-buttons which can be locked in engagement onto the telephone instrument. Apertures may be provided for access to one or more push-buttons to allow limited dialling of certain numbers. All of these arrangements require that the telephone instrument itself has to be specially modified to enable the particular housing or locking device to engage with the telephone instrument by drilling holes or by modifying individual push-buttons. For example, in European Patent Specification No. 0,074,617A, a push-button housing is described including a lock which engages one of the push-buttons which must be specially modified by cutting grooves in the sides thereof. Many of these prior art devices, some of which rely on frictional engagement, are not particularly secure, and modification of the telephone instrument is undesirable, and may not be permitted if the telephone is leased from a telephone company.

OBJECT OF THE INVENTION

The present invention therefore seeks to provide a security device for a telephone instrument which is both more secure and does not require any special modification of the telephone instrument itself. The invention especially seeks to provide a security device for a telephone instrument having a push-button dialling facility.

SUMMARY OF THE INVENTION

According to the present invention there is provided a security device for a telephone instrument adapted to releasably receive a telephone instrument between base and cover portions of the device with locking means to secure a telephone instrument between the base and cover portions whereby the cover portion is adapted to prevent full access to the telephone instrument dialling means while allowing access to the telephone handset.

The cover portion may be integrally-formed with the base portion so as to define a pocket adapted to releasably receive a telephone instrument. In this case, the locking means may be adapted to abut a protruding side of a telephone instrument received in the pocket to secure the telephone instrument in engagement with the device. The locking means may comprise a sliding display cabinet lock or a slidable holding member secured to a side extension of the base portion.

Alternatively, the cover portion may be hinged to the base portion. In this case, the locking means is suitably disposed between the base portion and the cover portion in a region remote from the hinge or hinges.

In another alternative, the cover portion may be slidable with respect to the base portion.

In yet another embodiment of the invention, the base portion may be adapted to accommodate a wall mounted telephone instrument.

BRIEF DESCRIPTION OF THE DRAWINGS

FIG. 4 is a perspective view of a second embodiment of a security device for a push-button telephone being a case having a cover hinged to a base, also showing a push-button telephone instrument received by the case, FIG. 5 is a perspective view of the case of FIG. 4 without the telephone instrument.

DETAILED DESCRIPTION OF PREFERRED EMBODIMENTS

Figure 1:
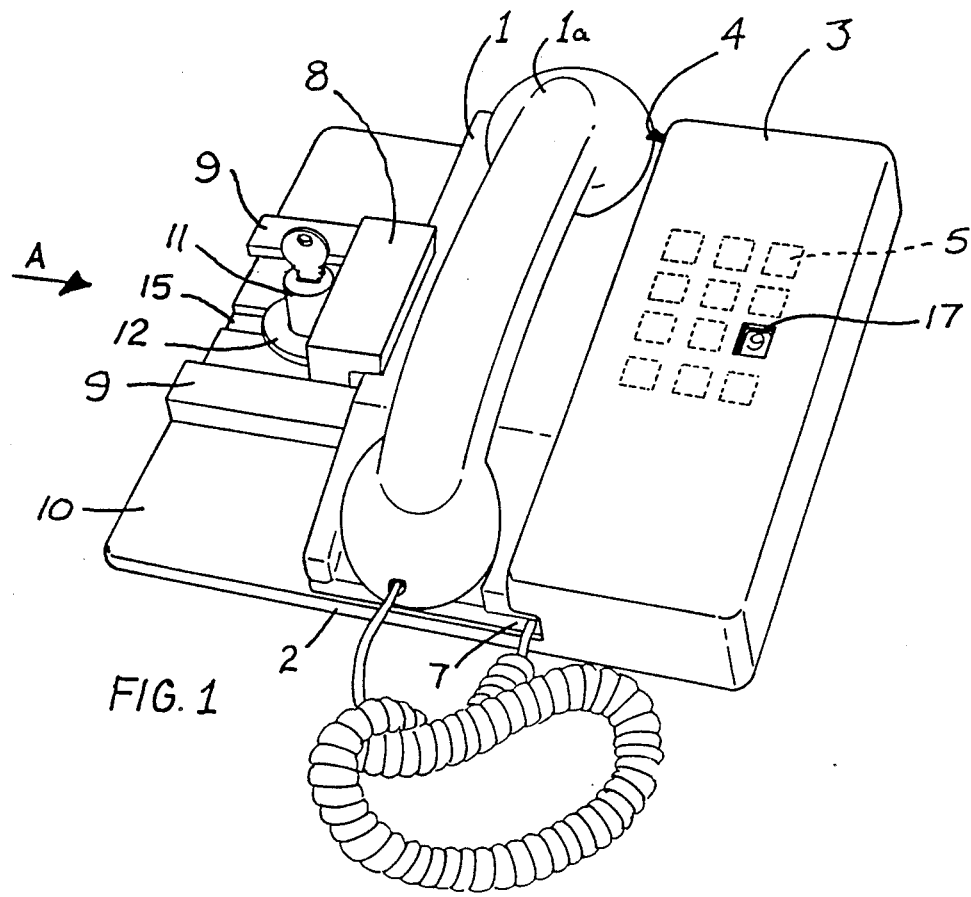
FIG. 1 is a perspective view of a push-button telephone security device having a base and integrally-formed cover, also showing a push-button telephone instrument received by the device.
Figure 2:
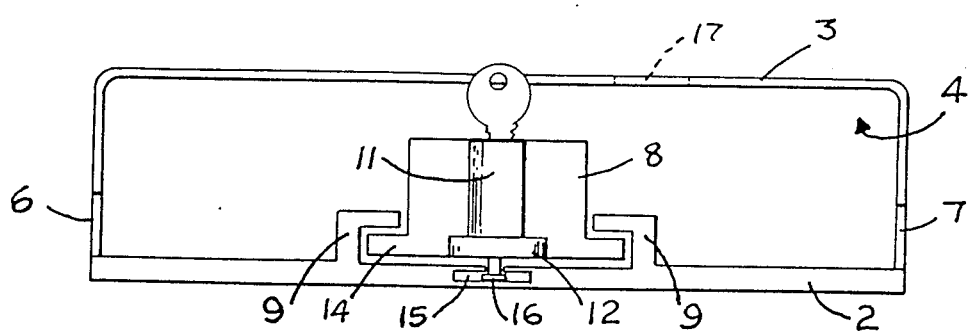
FIG. 2 is a side elevation of the device of FIG. 1, when viewed in the direction of arrow A, omitting the telephone instrument.
Figure 3:
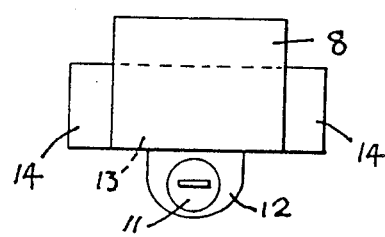
FIG. 3 is a plan view from above of the holding member and lock illustrated in FIG. 2.

Referring firstly to FIGS. 1 to 3 of the drawings, a security device for a push-button telephone instrument 1 comprises a flat base portion 2 with an integrally-formed cover portion 3 which is adapted to provide a pocket 4 for receiving the telephone instrument. The cover 3 encloses about half of the body of the telephone instrument 1 and prevents full access to the array of push-buttons 5, but allows free access to the telephone handset 1a. Notches 6 and 7 are cut out from the sides of the cover portion 3 allowing entry of the line in to the telephone instrument and line out to the telephone handset respectively.

To render the telephone instrument 1 secure against unauthorised use, the instrument is placed in between the base 2 and cover 3 as shown in FIG. 1. A holding member 8 is then engaged in parallel guide rails 9 which are formed as an integral part of a side extension 10 of the base 2. The holding member 8 slides along the rails 9 so as to abut the protruding side of the telephone instrument 1 to take up the position illustrated in FIG. 1. The instrument is then wedged securely in position on the device, and the holding member 8 is then locked in position with respect to the base extension 10 by means of lock 11. The lock 11 is a conventional key-operated tumbler lock which is secured to a tab 12 extending outwardly from a sole 13 of the holding member 8. FIGS. 2 and 3 show the holding member assembly in more detail, and it will be seen that the holding member is slidably engagable with guide rails 9 by means of flanges 14 which extend laterally from the sole 13. A central groove 15 is provided in the base extension 10 between the guide rails 9 to receive a protruding cam 16 of the tumbler lock 11. The groove 15 may be formed by an extruded metal insert for extra strength.

In an alternative arrangement excluding a holding member as described above, a tumbler barrel or cylinder lock having a laterally-extending spur is provided for sliding engagement in groove 15 as the locking means. For example, a conventional sliding display cabinet lock may be used for this purpose wherein the spur is adapted to abut the protruding side of the telephone instrument 1, when received by the device.

One of the advantages of the security device described with reference to FIGS. 1 to 3, is that it is capable of accommodating a range of telephone instruments of different dimensions. It will of course be appreciated that no modification of the telephone instrument itself is required, and that since access to the handset is not interfered with, the telephone can still be used to receive calls.

Another embodiment of the present invention will now be described with reference to FIGS. 4 and 5. A security case for a telephone instrument 1 is provided which comprises a flat base 20 with a cover 21 connected thereto by means of hinges 22. A cover extension 23 houses a barrel or cylinder key-operated tumbler lock 24, the cam of which engages a moulded receiver 25 in a side extension of the base 20, to secure the telephone instrument 1 when received by the device. It will be clear that the cover 21 defines a large cut-out 26 to accommodate the telephone handset 1a and that the cover extension 23 effectively encloses a "dead" space to one side of the telephone instrument in use. Notches 27 and 28 allow for entry of the line in to the telephone instrument, and the line out to the telephone handset respectively.

In both embodiments of the invention as described above with reference to FIGS. 1 to 3 and 4 and 5, an aperture 17 is formed in the respective cover 3 or 21, which permits access for example to the "9" button of the push-button array of the telephone instrument. Thus, when the telephone instrument is securely engaged in the case, it is still possible for telephone users to make an emergency call by dialling "999", assuming this were the number for emergency services.

Figure 6:
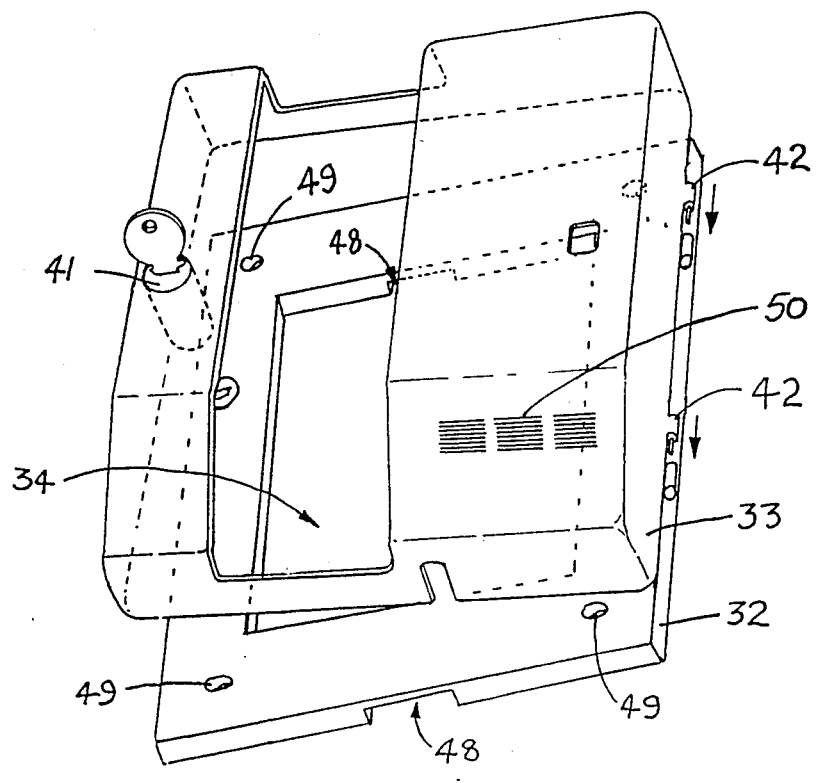
FIG. 6 is a perspective view of a third embodiment of a security device for a wall-mounted push-button telephone instrument.

FIG. 6 shows another embodiment of the invention adapted for use with a wall-mounted telephone instrument (not shown). A base portion 32 is provided with a cut-out or knock-out aperture 34. A cover portion 33 is hinged to the base 32 by means of lift-off hinges 42. Recesses 48 in the base can accommodate the line in to the instrument when mounted on a wall, while aperture 34 can accommodate a separate wall-mounting bracket if one is provided. Screw holes 49 are provided for wall fixing also. A grille 50 is provided to allow clear audibility of the telephone bell or buzzer, when the cover 33 is closed around the instrument and locked by means of lock 41. Conveniently, when not in use the cover 33 may be lifted off its hinges and removed entirely, leaving the base unobtrusively in place behind the instrument itself. In a modification, the base 32 may extend outside the periphery of the cover 33, such that aperture 34 accommodates the telephone instrument. In this way, the instrument may be mounted more closely against the wall surface. The base 32 may be in two pieces, if desired, i.e. a hinge section and a lock receiver section, which would be wall-mounted at the correct spacing apart.

The telephone security device is preferably injection moulded from suitable thermoplastics materials, for example, in ABS (acrylonitrile butadiene styrene) plastics which may be coloured or transparent. Preferably the device is made from materials which are similar to, or match, the telephone instrument itself so as to provide a more attractive appearance. It is also desirable for the cover portion at least to be made of a substantially rigid plastics material. The tumbler lock 11 or 24, and hinges 22 are preferably made of chrome-plated metal but hinges 22 may be of moulded plastics. Rubber feet (not shown) may also be provided on the bottom of the base 2 or 20. Alternatively, a robust locking device made entirely of strong plastics materials may be provided.

The overall shape and dimensions of the telephone security device may vary according to the particular model of telephone instrument for which it is to be used. However, several models may fit the same security device, or the device may be specially adapted to be a precise fit with the most commonly available telephone instruments such as those approved by the national utility.

I claim

1. A security case for a telephone instrument including dialling means and a separate handset, comprising
a base portion adapted to fit under the telephone instrument,
a dial cover portion adapted to extend from and articulate with the base portion to enclose the telephone instrument when in a closed condition except for the handset, wherein the cover portion defines an aperture to accommodate the handset, thereby preventing full access to the dialling means in the closed condition while allowing unobstructed access to the handset,
a cover extension portion extending from one side of the dial cover portion adapted in use in the closed condition to define and enclose a space to one side of the telephone, and
locking means housed within the cover extension portion and adapted to releasably engaged the base portion with the dial cover portion so as to retain the telephone instrument therebetween, wherein the dial cover portion defines an aperture adapted in use to locate above the push button associated with a push button dialling means and used to call emergency services, thereby not preventing an outgoing emergency call in the closed condition.

2. A security case as claimed in claim 1 wherein the dial cover portion is hinged to the base portion.

3. A security case as claimed in claim 2 wherein the locking means is disposed between the base portion and the dial cover portion in a region remote from the hinges.

4. A security case as claimed in claim 1 wherein the dial cover portion is slidable with respect to the base portion.

5. A security case as claimed in claim 1 wherein—the base portion is adapted for wall mounting, and adapted to receive a telephone instrument, and
the dial cover portion is adapted to engage detachably with the base portion.

6. A security case as claimed in claim 2 wherein the cover portion is hinged to the base portion by means of lift-off hinges.

7. A security case as claimed in claim 5 wherein the base portion defines an aperture to accommodate a separate telephone wall mounting bracket.

8. A security device for a telephone instrument including dialling means and a separate handset, comprising
a generally flat base portion,
a dial cover portion integrally formed with the base portion so as to define a raised pocket adapted to partially receive the telephone instrument and thereby prevent full access to the dialling means while allowing unobstructed access to the handset, a base portion side extension, extending away from the dial cover portion, a movable abutment member located on the base portion side extension adapted to abut a protruding side of a telephone instrument received in the pocket, and to move in the plane of the base, and, locking means adapted to releasably engage the abutment member with respect to the base portion side extension to hold the telephone instrument in the pocket defined by the dial cover portion. whereby different sizes of telephone instrument may be accomodated by the device.

9. A security device as claimed in claim 8 wherein the abutment member comprises a slidable holding member adapted to slide inwardly and outwardly along guide means located on the side extension of the base portion, towards and away from the pocket.

10. A security case for a telephone instrument including dialling means and a separate handset, comprising a base portion adapted to fit under the telephone instrument, a dial cover portion adapted to extend from and articulate with the base portion to enclose the telephone instrument when in a closed condition except for the handset, wherein the cover portion defines an aperture to accommodate the handset, thereby preventing full access to the dialling means in the closed condition while allowing unobstructed access to the handset, a cover extension portion extending from one side of the dial cover portion adapted in use in the closed condition to define and enclose a space to one side of the telephone, and locking means housed within the cover extension portion and adapted to releasably engage the base portion with the dial cover portion so as to retain the telephone instrument therebetween, wherein the dial cover portion defines a grille, which in use in the closed condition, locates above a telephone speaker associated with buzzer means, thereby not hindering audibility of the telephone buzzer.

* * * * *